March 22, 1955  E. V. SMUTNY  2,704,404
WORK CENTERING DEVICE FOR MILLING MACHINES
Filed Sept. 18, 1951  2 Sheets-Sheet 2
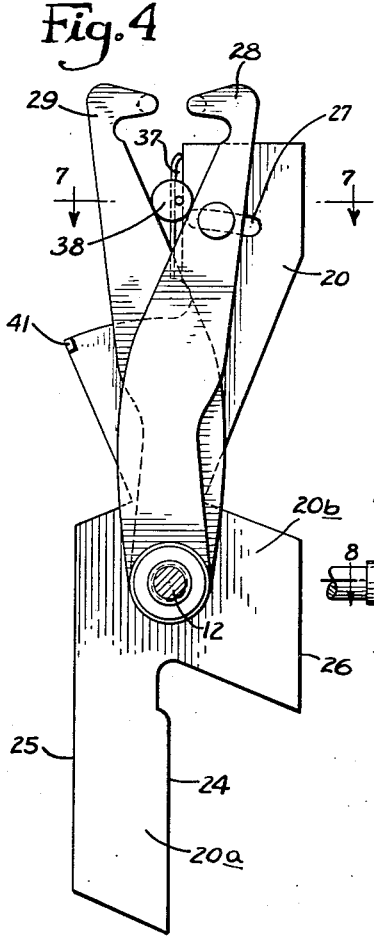
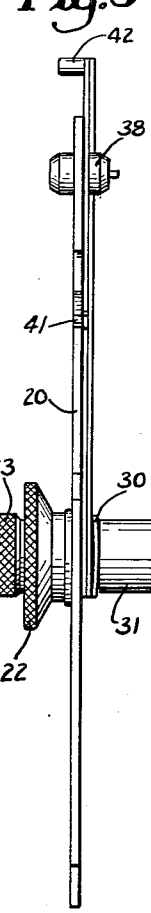
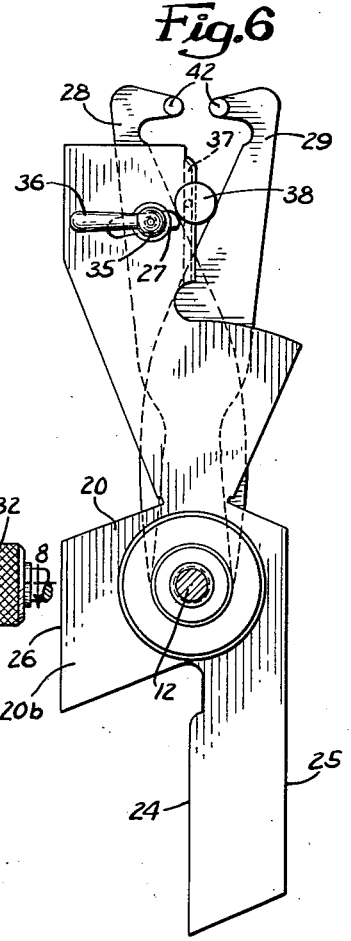
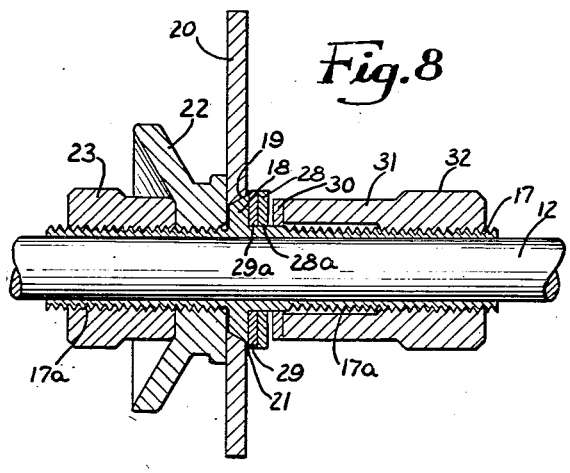
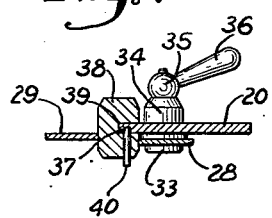
INVENTOR.
Edward V. Smutny
BY Edward W. Weinert
Atty.

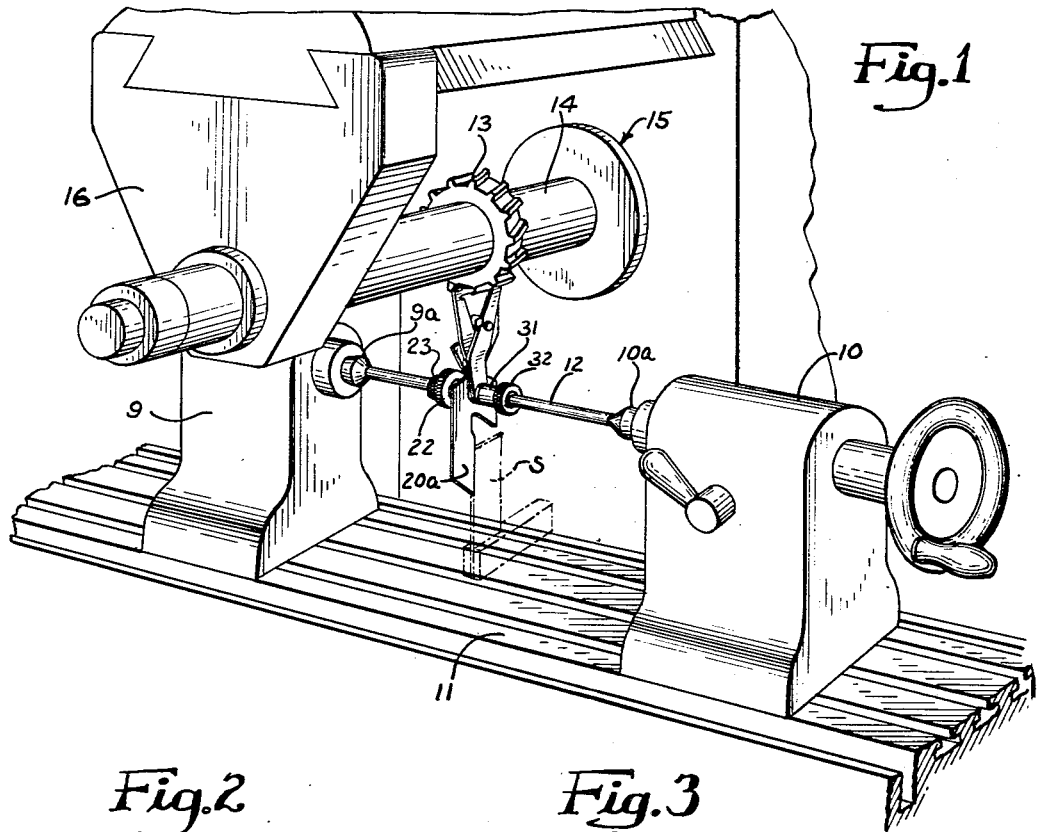

United States Patent Office 2,704,404
Patented Mar. 22, 1955

2,704,404

WORK CENTERING DEVICE FOR MILLING MACHINES

Edward V. Smutny, Chicago, Ill.

Application September 18, 1951, Serial No. 247,145

14 Claims. (Cl. 33—185)

This invention relates to a work centering device for milling and like machines and concerns itself with means adapted to be temporarily mounted between the tail stock and dividing head of a milling machine and comprising a pair of coacting jaw members adapted for contacting opposite sides of the cutting element of the milling machine with means for centering the jaw members with respect to the vertical axis of the device.

In the past, it has been necessary to manually aline the work with the cutting element and this involved much fiddling around or mathematical computation or trial and error and also involved much loss of time.

It is an object of this invention to overcome the above noted objections in the provision of a novel centering device which requires no computations or fiddling around or material loss of time and which can be set by any novice and adjusted to bring the work position and cutting element into the same vertical plane.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Fig. 1 is a fragmentary perspective view of a milling machine illustrating the application of this invention;

Fig. 2 is an elevational and diagrammatic view of the jaws illustrating the truing operation, when the table is moved in one direction;

Fig. 2a is a view similar to Fig. 2 illustrating operation;

Fig. 3 is a view similar to Fig. 2 illustrating the truing operation when the table is moved in the other direction;

Fig. 4 is a side elevational view of the centering device with the supporting rod shown in section and upon an enlarged scale, involving this invention;

Fig. 5 is an edge elevational view of the said centering device;

Fig. 6 is an enlarged side elevational view of the centering device showing the side opposite to the one shown in Fig. 4;

Fig. 7 is a fragmentary sectional view taken upon the line 7—7 of Fig. 4; and

Fig. 8 is a sectional view taken upon the line 8—8 of Fig. 5.

In referring now to the drawing, there is shown a part of a milling machine having a head 9 and a tail stock 10 supported upon the usual work table 11. The head and tail stock have the usual alined work supporting bearings 9a and 10a respectively which support the rod 12 carrying the centering or truing device which can be inserted and removed before the work is inserted in the machine. Thus the axis of the bearings 9a and 10a can be brought into the vertical plane of the cutter 13 on shaft 14 mounted in bearings 15 upon the frame 16 of the milling machine.

The centering device involving this invention consists of the rod 12 upon which there is freely mounted an externally threaded sleeve 17 (Fig. 8). This sleeve has an intermediate collar 18 with a sloping perimeter 19; the sleeve being threaded upon each side of the collar as indicated at 17a. A standard 20 has a bevelled aperture 21 intermediate its length that frictionally engages the sloping perimeter of the collar 18, being forced into tight frictional relation therewith by a nut 22 threaded upon the sleeve 17. A lock nut 23 also threaded upon the sleeve prevents loosening of the nut 22.

The standard 20 has a tail portion 20a which extends downwardly in a substantially vertical plane and this tail portion 20a has parallel side edges 24 and 25 which are also in substantially vertical planes. The standard also has a side wing 20b with a straight edge 26 parallel to the edges 24 and 25, the purpose of which will later appear. The upper portion of the standard 20 is provided with an arcuate slot 27, the purpose of which will later appear.

A pair of jaw members 28 and 29 provided with apertures 28a and 29a respectively at their lower ends are mounted upon the sleeve 17 adjacent the collar 18 upon the side opposite the nut 22. A friction washer 30 is positioned against the jaw member 28 upon the sleeve 17 and a nut 31 with a knurled head 32 is threaded upon the sleeve 17 for pressing the friction washer 30 against the jaw members to tighten the same against swinging movements when the jaw members have been set as will later more fully appear.

The jaw member 28 carries a bolt 33 (Fig. 7) at its upper end which extends through the arcuate slot 27 in the standard. A thick clamping washer 34 which telescopes over the bolt 33 upon the opposite side of the standard is adapted to be urged against the standard by a nut 35 threaded upon the outer end of the bolt and having a handle 36 for tightening and loosening the same. Thus the jaw member 28 can be clamped in desired position, as will later more fully appear.

The upper portion of the standard 20 has a vertical guideway 37. A centering button 38 in the form of a small cylinder with an intermediate guide slot 39 slidably fitting over an edge portion of the standard has a pin 40 slidably engaging the guideway 37. The center of this centering button, which can be lowered and raised, is located in the vertical center line of the device and between the two jaw members and bisects the angle therebetween under conditions of use.

However, the swinging movements of the jaw member 28 are limited by the arcuate slot 27 while the outward movement of the jaw member 29 may be limited by a stop 41 on the standard as shown in Fig. 4. The upper ends of the jaw members which project toward each other carry cutter engaging pins 42 which are adapted to be moved against the opposite faces of the cutting element.

When it is desired to bring the axis of the work in the true vertical plane of the cutter 13, the centering device as described is positioned between the tail stock and the dividing head of the machine as shown in the drawings. The two jaw members are then swung or moved into engagement with opposite sides of the cutting tool as shown in Figs. 1 to 3. The nut 31 should then be tightened to bind the jaw members against the collar. If under tension, the nut 35 should be loosened and then the centering pin 38 should be pressed downwardly to simultaneously engage the confronting edges of the jaw members. During this movement of the centering pin, the standard 20 will slightly rotate to bring the inner edge of the standard into the angle bisecting line which will be the true center line. It will be noted that the vertical line passing through the center of the centering pin substantially coincides with the inner edge of the standard 20 as is apparent from Fig. 7. The nut 35 should now be tightened, an operation which will clamp the jaw member 28 to the upper portion of the standard. With the parts in such position, it is not known whether the cutting tool is in the vertical plane of the axis of the rod 12 and this must be determined by a square S shown in dotted lines in Fig. 1.

The square S may be placed upon the table with one leg positioned against a straight edge 24, 25 or 26 on the standard 20. In Fig. 2, the square is shown diagrammatically against the edge 25 of the standard and for purposes of illustration, the edge 25 is not shown plumb with the square. Accordingly, the table must be moved in the direction of the arrow. This movement of the table will move the axis of the rod 12 in the direction of the arrow while the jaw member 29, which is frictionally clamped to the sleeve 17, will fulcrum against the cutter and cause a turning movement of the sleeve 17 and the parts thereon to bring the edge 25 of the standard plumb with the square.

In Fig. 3 there is shown an instance where the table has to be moved in the other direction. When the table is moved to the left as shown in Fig. 3, the pin 42 of jaw member 28 will fulcrum against the cutter and cause the standard 20 to move or swing into plumb relation with the square.

Thus it will be apparent that this centering device is designed to show the necessary direction and the amount of movement of the work table to bring the axis of the rod 12, which will also be the axis of the work, into the vertical plane of the cutting tool. No computation or method of trial and error are required as in the past. As a result, much time and labor will be saved in the use of this invention. This has already been demonstrated in actual use.

I am aware that many changes may be made and various details of construction may be modified without departing from the principles of this invention, so I do not propose limiting the patent granted otherwise than necessitated by the appended claims.

I claim:

1. In a device of the class described, a supporting rod, a sleeve freely mounted upon said rod, a standard frictionally mounted upon said sleeve and having an upper portion and a tail portion, said tail portion having a straight edge, a pair of jaw members movably mounted upon said sleeve adapted for engaging opposite sides of a cutting element and defining an angle, a centering pin mounted upon said standard and normally engaging said jaw members and movable in the bisecting plane of said angle, means for clamping one of said jaw members to said standard and friction means for clamping said jaw members to said sleeve.

2. In a device of the class described, a support, a pair of swingable jaw members mounted side by side upon said support and defining an angle, means for frictionally clamping said members in set position, a standard mounted upon the said support and having an upper portion and a tail portion with a straight edge, a centering pin mounted upon the upper portion of said standard and normally engaging said jaw members for elevating and lowering movements in the bisecting plane of said angle and means for releasably clamping one of said jaw members to said standard.

3. In a device of the class described for use with a cutting tool and head and tail stock having a work axis: means for indicating whether said axis is in the vertical plane of said cutting tool comprising a pair of movable members for engaging opposite sides of said tool and defining an angle therebetween, a truing standard having a centering pin and normally engaging said jaw members movable in the bisecting plane of said angle, means for supporting said members and standard for relative movement and friction means for binding said members in set positions, said axis being movable while one of said members fulcrums against said cutting tool for truing said standard.

4. In a device of the class described for centering a cutting tool, a supporting rod, a sleeve freely mounted upon said rod, a standard frictionally mounted upon said sleeve and having a head portion and a tail portion with a straight edge, a pair of jaw members movably mounted upon said sleeve and normally engaging the sides of said cutting tool, means for frictionally engaging said jaw members with said sleeve, said jaw members defining an angle, and a centering pin mounted for sliding movements upon the head portion of said standard and movable in the bisecting plane of said angle.

5. In a device of the class described, a rod, a sleeve freely mounted upon said rod, a pair of coacting jaw members mounted upon said sleeve and defining an angle therebetween, a truing standard mounted upon said rod, a centering pin slidably mounted upon said standard and normally engaging said jaw members for movement in a predetermined plane bisecting the angle between said jaw members, movement of said centering pin causing movement of said standard under predetermined conditions.

6. In a device of the class described, a rod adapted to be mounted between the head and tail stock of a milling or like machine, a sleeve loosely mounted upon said rod, a standard mounted upon said sleeve and having an upper portion and a tail portion with a straight edge, said top portion having an arcuate slot and a vertical guide way, a slidable centering button mounted upon said top portion and having means extending into said guide way for guiding said button in a rectilinear path, a pair of coacting jaw members mounted upon said sleeve for movement toward and from each other and defining an angle therebetween, friction means for clamping said jaw members in set position, one of said jaw members having a bolt extending through said slot, and a nut on said bolt for clamping said one jaw member to said standard, said centering button being slidable in the bisecting plane of said angle for moving said standard into said bisecting plane.

7. In a device of the class described, a rod, a sleeve freely mounted upon said rod, a standard rotatable upon said sleeve and having a slidably mounted centering button, a pair of coacting jaw members mounted upon said sleeve and adapted for engaging opposite sides of a cutting tool and defining an angle therebetween, means for clamping said jaw members in set position, means for clamping one of said jaw members to said standard, movement of said centering button in the bisecting plane of said angle into engagement with both jaw members causing a shifting of said standard under certain conditions.

8. In a centering device, a cylindrical member, a standard mounted upon said member for rotary movements, a pair of coacting jaw members mounted upon said member for rotary movements and adapted for engaging opposite sides of a cutting tool and defining an angle therebetween, means for clamping said jaw members in set positions, a centering button slidably mounted upon said standard in the bisecting plane of said angle and slidable into engagement with both jaw members for moving said standard when out of alignment with the upper inner edge thereof into the said bisecting plane and means for clamping one jaw member to said standard.

9. In a device of the class described, a supporting member, a standard having a truing edge frictionally mounted upon said supporting member for limited rotary movement, a pair of co-acting jaw members mounted upon said supporting member adjacent said standard, said jaw members having rotary movements relative to said standard, adapted for engaging opposite faces of a cutting tool, means for clamping said jaw members in set position with respect to said cutting tool and a pin slidably mounted at one edge of said standard and movable against and between said jaw members in the bisecting line of the angle between said jaw members and alining said standard with said line.

10. In a device of the class described, a supporting member adapted for positioning in the place of a work piece in a milling machine, a standard frictionally mounted upon said supporting member for limited rotary movement, a pair of co-acting jaw members journalled upon said supporting member adjacent said standard and adapted for engaging opposite faces of a cutting tool, means for clamping one jaw member to said standard, means for clamping the other jaw member in set position, said jaw members defining an angle therebetween with the bisecting line thereof being in alinement with said cutting tool and a guide pin slidably mounted at one edge of said standard and slidable in the angle between said jaw members into engagement with both jaw members in the bisecting line of said angle and causing a shifting of said standard under certain conditions.

11. In a device of the class described, a support, a standard mounted upon said support for rotary movement, said standard having a part with a straight edge extending below said support and having a part with a guideway extending above said support, a pin slidably mounted in said guideway, a pair of coacting jaw members mounted upon said support for rotary movement and extending above said support and defining an angle therebetween, said pin being located in the bisecting plane of said angle and being movable for engaging said jaw members and causing movement of said standard.

12. In a device of the class described, a support, a standard mounted upon said support for rotary movement, said standard having a portion with a straight edge extending below said support and having a part with a guideway extending above said support, a pair of coacting jaw members mounted upon said support for rotary movement and defining an angle therebetween, means for frictionally clamping said jaw members in set positions and a pin slidably mounted in said guideway and located in said angle and being movable for engaging said jaw members in the bisecting plane of said angle for the purpose set forth.

13. For use with a machine having a cutting tool and a laterally movable table carrying spaced supports adapted for holding material to be cut: a rod supported between said supports, a pair of jaw members on said rod for engaging opposite sides of said cutting tool, means for clamping said jaw members in set positions, said rod being laterally movable with the table while one of said jaw members fulcrums against said cutting tool and means for indicating the position of said rod with respect to a vertical plane passing thru said cutting tool.

14. For use with a machine of the class described having a cutting tool and work holders having an axis: means for indicating whether said axis is in proper alinement with said cutting tool comprising a pair of coaxially mounted jaw members in the line of said axis adapted for engaging opposite sides of said cutting tool, a pin movable in the bisecting plane of said jaw members for engaging them with opposite sides of said tool and means responsive to the movement of said pin for indicating the position of said axis with respect to the cutting tool.

References Cited in the file of this patent

UNITED STATES PATENTS

| | | |
|---|---|---|
| 48,018 | Hall | May 30, 1865 |
| 56,164 | Berkeley | July 10, 1866 |
| 1,486,667 | Jerman | Mar. 11, 1924 |
| 1,794,162 | Flamm | Feb. 24, 1931 |
| 2,243,201 | Fornelius | May 27, 1941 |
| 2,472,241 | Wilson | June 7, 1949 |
| 2,635,348 | Jones | Apr. 21, 1953 |

FOREIGN PATENTS

| | | |
|---|---|---|
| 193,181 | Germany | Dec. 19, 1907 |